United States Patent [19]
Jenkins

[11] Patent Number: 4,887,295
[45] Date of Patent: Dec. 12, 1989

[54] TELEPHONE INSTRUMENT

[75] Inventor: James O. M. Jenkins, Swansea, Wales

[73] Assignee: Siliconix Limited, Wales

[21] Appl. No.: 59,629

[22] Filed: Jun. 8, 1987

[30] Foreign Application Priority Data

Jul. 14, 1986 [GB] United Kingdom ............... 8617117

[51] Int. Cl.$^4$ ............................................. H04M 1/31
[52] U.S. Cl. .................................... 379/362; 379/387; 379/424
[58] Field of Search ............... 379/362, 387, 422, 424, 379/413, 352, 390, 392, 388

[56] References Cited

U.S. PATENT DOCUMENTS

| | | | |
|---|---|---|---|
| 4,360,710 | 11/1982 | Chaput et al. | 379/352 |
| 4,465,903 | 8/1984 | Barber | 379/90 |
| 4,492,823 | 1/1985 | James et al. | 379/387 |
| 4,506,112 | 3/1985 | Bitsch | 379/377 |
| 4,647,787 | 3/1987 | Pommer, II | 379/387 X |
| 4,653,088 | 3/1987 | Budd et al. | 379/165 |
| 4,756,021 | 7/1988 | Nakayama | 379/388 |

FOREIGN PATENT DOCUMENTS 2177583 6/1984 Australia .
8700717 1/1987 PCT Int'l Appl. .

*Primary Examiner*—James L. Dwyer
*Attorney, Agent, or Firm*—Roylance, Abrams, Berdo & Goodman

[57] ABSTRACT

Telephone instruments generally comprise a mechanical hookswitch connected across the pair of speech wires. This specification discloses solid state hookswitch circuitry comprising a switching transistor controlled by a hookswitch and connected in series with the output of a rectifier, the rectifier being connected directly to the incoming speech wires. Because the hookswitch controls a switching transistor, rather than having to switch line voltages directly, any reliable low current make/break switch may be employed.

4 Claims, 2 Drawing Sheets

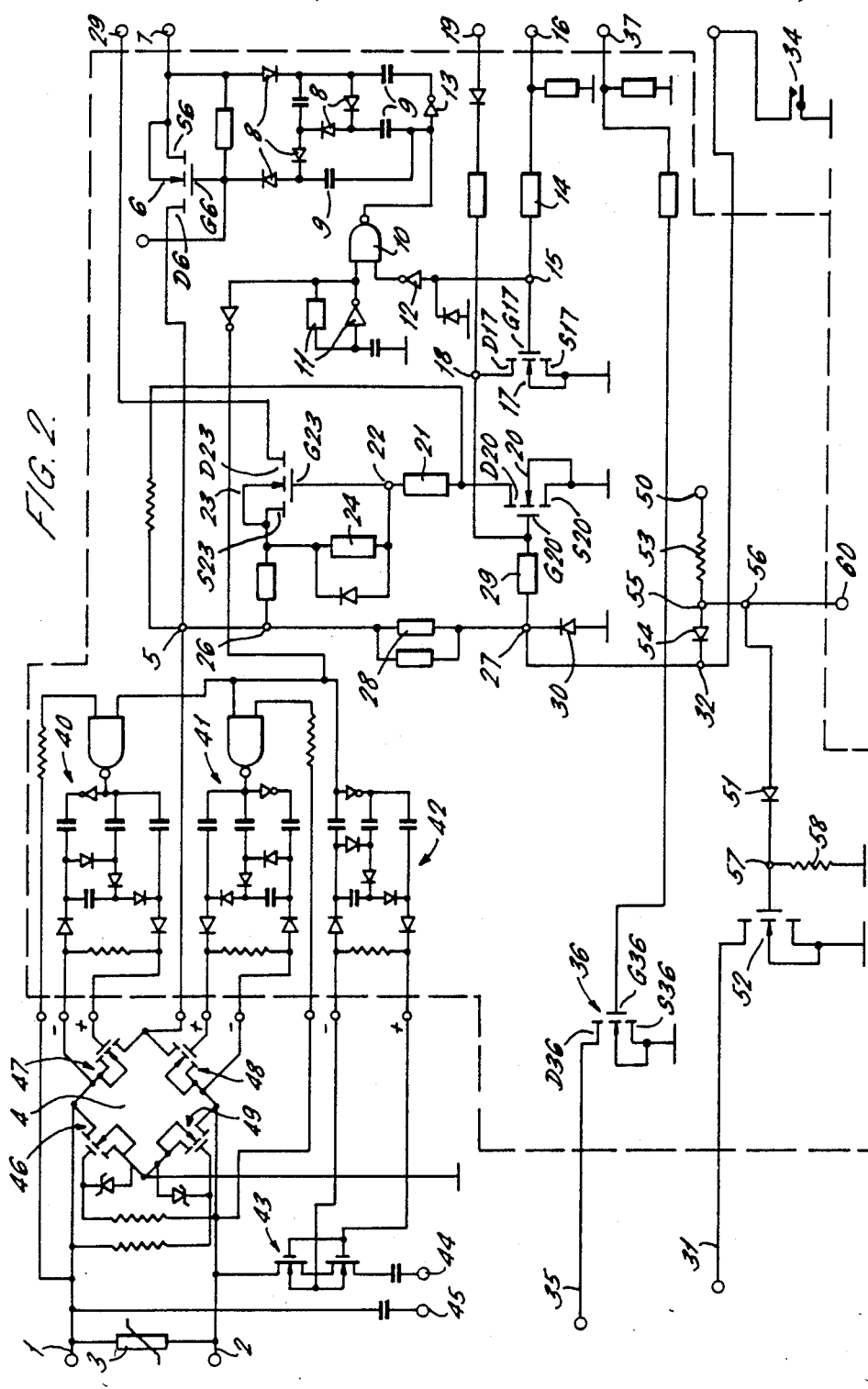

TELEPHONE INSTRUMENT

FIELD OF THE INVENTION

This invention relates to telephone instruments having electronic operating circuitry.

BACKGROUND OF THE INVENTION

The two incoming transmission lines of a telephone instrument are typically connected to the terminals of a hookswitch, the hookswitch being a pair of switches operated by lifting the handset of the instrument. With the handset down, or "on-hook", the hookswitch contacts connects the two incoming lines to a ringing circuit, isolating the speech circuitry from the lines, whereas with the handset up, or "off hook" they connect the incoming lines to a rectifier supplying the speech circuitry of the instrument. The rectifier provides the unidirectional voltage of the correct polarity required by the electronic speech and operating circuitry of the instrument, the polarity of the voltage across the pair of incoming lines being unknown.

In this way, the hookswitch isolates the speech and operating circuitry from the incoming lines until the subscriber goes "off-hook".

The hookswitch contacts are subject to a quiescent line voltage of approximately −50 volts, a ringing voltage of approximately 80 volts RMS, and, in exceptional circumstances such as lightning strikes and line testing, voltage surges of a maximum of 240 volts. The manufacturing costs of a hookswitch which can tolerate these voltages are relatively high in comparison with other parts of the telephone instrument, particularly because of the assembly of mechanical parts that is required.

STATEMENT OF THE INVENTION

The object of the present invention is to provide a telephone instrument which enables a cheaper form of hookswitch to be employed.

In accordance with the present invention, a telephone instrument having electronic operating circuitry comprises a rectifier to provide, from the telephone line voltage, a d.c. supply voltage of predetermined polarity for the electronic operating circuitry, and a hookswitch operable to apply the d.c. voltage when the instrument is off-hook, and includes a switching transistor connected in series with the output of the rectifier and controlled by the hookswitch to supply the d.c. voltage from the rectifier to the operating circuitry. Because the hookswitch is employed only to control the switching transistor, rather than switch line voltages directly as in the prior art, any reliable low current make/break switch may be employed.

According to one aspect of the invention there is a further switching transistor operable to control the first mentioned switching transistor and controlled by the hookswitch.

In one embodiment, the switching transistors comprise field effect transistors.

According to another aspect of the invention there is provided a control terminal for receiving a control signal to override the hookswitch in controlling said switching transistor. In one embodiment, there is provided a line current interrupt switch operable to generate dialing pulses on the telephone lines, and dialing control pulse generating means to provide control pulses to said control terminal.

BRIEF DESCRIPTION OF THE DRAWINGS

An example of the invention will now be described with reference to the accompanying drawings also forming part of this disclosure, in which each of FIGS. 1 and 2 is a circuit diagram of part of the circuit of a telephone instrument having electronic operating circuitry.

DETAILED DESCRIPTION OF PREFERRED EMBODIMENTS

Figure 1:
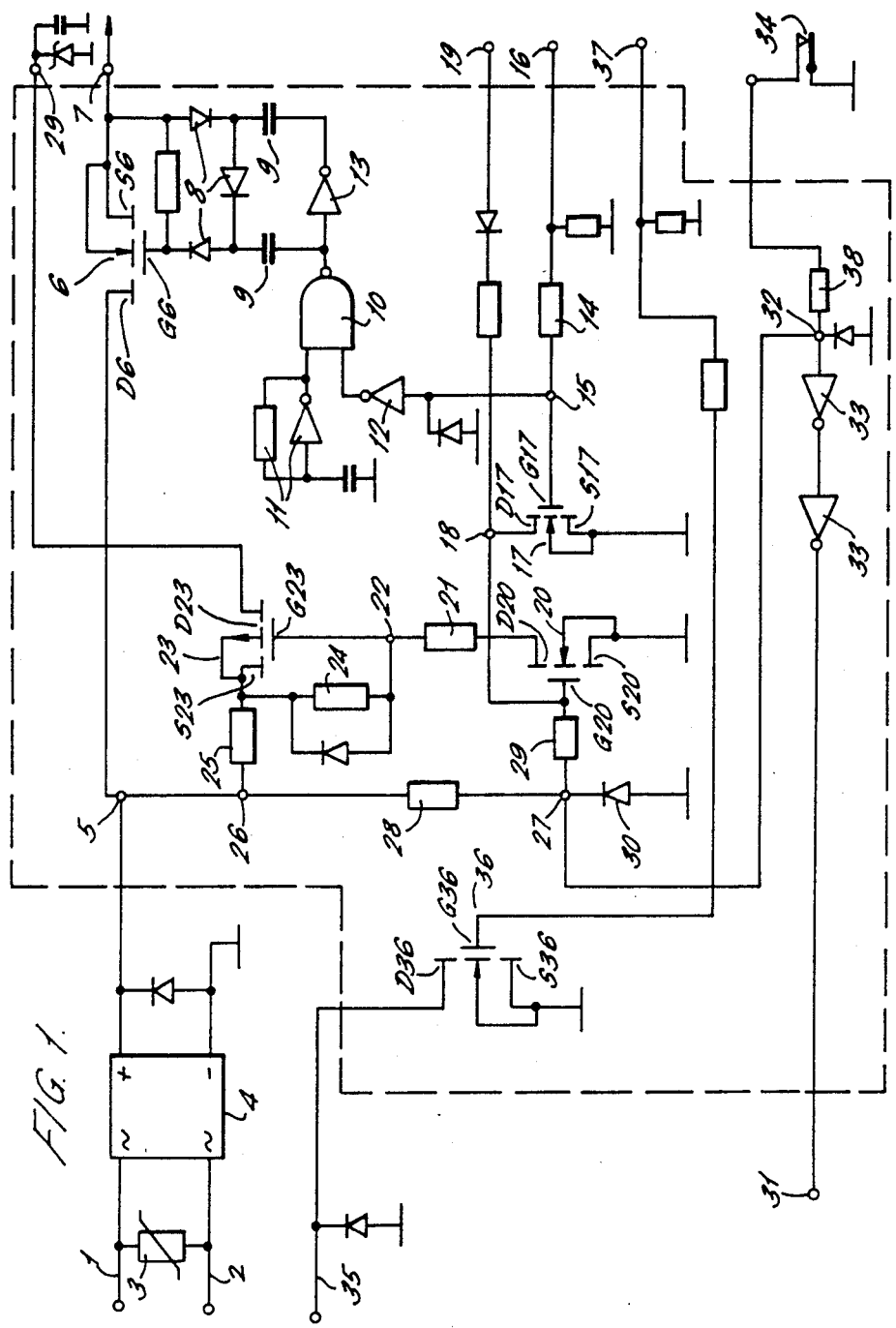

Referring now to FIG. 1, the telephone transmission lines 1 and 2, connected via a surge protector unit 3, are further connected to the input terminals of a bridge rectifier 4. A terminal 5 receives a line voltage of positive polarity from the bridge rectifier 4. A switching transistor 6 is connected between terminal 5 and a terminal 7, wherein terminal 7 is connected to the speech circuitry of the telephone instrument. The transistor 6 comprises an N-channel enhancement type MOSFET having its drain D6 connected to terminal 5 and its source S6 connected to terminal 7. A floating driver is connected across the gate G6 and source S6 of MOSFET 6 and comprises a network of diodes 8 arranged to form a diode pump, capacitively linked by two capacitors 9 to the output of a NAND gate 10. An oscillator 11 is connected to one input of the NAND gate 10, whereas the output of an inverter 12 is connected to the other input of the NAND gate 10. The input to the inverter 12 is connected to a terminal 15, there being a further connection from terminal 15 to a terminal 16 via a resistor 14. Terminal 16 receives control pulses from a dialing control pulse generating circuit (not shown). Terminal 15 is further connected to the gate G17 of an N-channel enhancement type MOSFET 17 whose source S17 is directly connected to earth and whose drain is directly connected to a terminal 18. Terminal 18 is connected to a terminal 19 and further separately connected to the gate G20 of a high voltage N-channel enhancement type MOSFET 20. The source S20 of MOSFET 20 is connected directly to earth whereas the drain D20 is connected via a resistor 21 to a terminal 22. Terminal 22 is directly connected to the gate G23 of a high voltage P-channel enhancement type MOSFET 23 and connected via a resistor 24 to the source S23 of MOSFET 23.

The source S23 is connected to a terminal 26 via a resistor 25, terminal 26 being directly connected to terminal 5 and further separately connected to a terminal 27 via a resistor 28. The drain D23 is connected to a terminal 29, wherein terminal 29 is connected to the power supply terminals of oscillator 11 and logic gates 10, 12 and 13. Terminal 27 is connected via resistor 29 to the gate G20 of MOSFET 20, and separately connected to Earth via a reverse biased diode 30 and further separately connected to a terminal 32. Terminal 32 is itself connected via resistor 38 to one terminal of a hookswitch 34, the other terminal of the hookswitch 34 being connected directly to Earth. Terminal 32 is further separately connected via a buffer unit comprising two series connected inverters 33 to a terminal 31.

The third incoming telephone line 35 is connected to the drain D36 of a high voltage N-channel enhancement type MOSFET 36. The source S36 of MOSFET 36 is connected directly to earth whereas the gate G36 is connected to a terminal 37.

The operation of the circuit is as follows. When the hookswitch 34 is closed i.e. the handset is on-hook, terminal 27 is provided with a low resistance path to Earth via terminal 32, resistor 38 and the hookswitch. During quiescent conditions the D.C. voltage at terminal 5 of approximately 50 volts is dropped almost entirely across resistor 28 and terminal 27 remains close to Earth potential. The telephone instrument thus draws only a few microamps of current from the transmission lines even when on-hook. Since terminal 27 is close to Earth potential, gate G20 of MOSFET 20 is not held sufficiently positive with respect to source S20 to allow MOSFET 20 to turn on. There is thus no drain current flowing via resistors 21, 24, and 25; gate G23 of MOSFET 23 is therefore not held sufficiently negative with respect to the source S23 to allow MOSFET 23 to turn on. Terminal 29 is thus isolated from terminal 5, thereby preventing the supply of power to oscillator 11 and logic gates 10, 12 and 13, and, consequently, the operation of the floating driver 8 and 9.

Gate G6 of MOSFET 6 is thus not held positive with respect to the source S6 and so MOSFET 6 is off, constituting a line current interrupt. When the exchange superposes a ringing voltage of approximately 80 volts RMS on the transmission lines, a ringing circuit (not shown) is activated. Although the voltage at terminal 5 follows the ringing voltage, terminal 27 is still held close to ground: MOSFETS 20 and 23 remain off, as does MOSFET 6.

When the hookswitch 34 is open, i.e. the handset is off-hook, terminal 27 is no longer held close to Earth. Even with a minimal line voltage, terminal 27 rises to a sufficiently positive voltage to allow the gate G20 of MOSFET 20 to turn MOSFET 20 on. A drain current thus flows from terminal 5 to earth via resistors 25, 24 and 21 and MOSFET 20. The voltage drop across resistor 24 is sufficient to hold gate G23 sufficiently negative with respect to source S23 to allow MOSFET 23 to turn on.

Consequently terminal 29 is at a positive voltage allowing power to be supplied to the oscillator 11 and logic gates 10, 12 and 13. During speech transmission, terminal 16 (labelled line interrupt and connected to the dialing control pulse generating circuit), is at logic 0; the output of the inverter 12 is consequently constant at logic 1. The output of the NAND gate 10, however, oscillates due to oscillator 11: the floating driver comprising diode pump 8 and capacitor 9 thus takes and maintains gate G6 at MOSFET 6 positive with respect to source S6. Consequently, MOSFET 6 turns on, allowing the transmissioin of the line current to the speech circuitry.

When terminal 16 receives a dialing control pulse at logic 1, the output of inverter 12 sinks to logic 0: the output of NAND gate 10 is then constant at logic 1 resulting in the diode pump 8 ceasing to function. Consequently, gate G6 of MOSFET 6 is not held positive with respect to source S6 and so MOSFET 6 turns off, resulting in, therefore, an interruption in the line current when a control pulse is received at terminal 16. Regular, momentary interruptions are established by the dialing control pulse generating circuit connected to terminal 16. The pulse trains are transmitted via transmission lines 1 and 2 to a receiving terminal to operate automatic line selection equipment.

Furthermore, during normal conditions when the handset is off-hook, loading of the transmission lines by the power supply connected to terminal 29 is minimised by resistor 25. There is also provided, via terminal 19, a hookswitch override: with the hookswitch closed, i.e. during normal on-hook conditions, a logic 1 applied to terminal 19 will allow the gate G20 of MOSFET 20 to go positive, thereby turning on MOSFET 20 and, consequently, MOSFETS 23 and 6. On-hook dialing can therefore be achieved.

In addition, there is provided a recall function via terminal 37: with the hookswitch open, a logic 1 applied to terminal 37 takes the gate G36 of MOSFET 36 sufficiently positive with respect to source S36 to turn MOSFET 36 on. There is thus provided a path to Earth for current on line 35 via the drain and source of MOSFET 36, constituting a recall notification.

Referring now to FIG. 2, in which like numerals correspond to the components hereinbefore described, the telephone transmission lines 1 and 2, connected via a surge protector unit 3, are further connected to the input terminals of a bridge rectifer 4. The rectifier 4 comprises a bridge of N channel enhancement type high voltage MOSFETS, having a first pair of MOSFETS 46 and 47 switched directly by the voltages on the transmission lines 1 and 2, and the second pair 47 and 48 switched by a respective pair of voltage quadrupler networks 40 and 41. The voltage quadruplers act as floating drivers, generating sufficient gate-source bias to turn MOSFETS 47 and 48 on when oscillator 11 is operating. With no gate-source bias is applied by drivers 40 and 41 a current of only a few microamps is drawn from the bridge to terminal 5. Conversely, with a gate-source bias applied, either MOSFETS 47 or 48 passes a drain current with an associated potential drop across the MOSFET of a fraction of the 0.7 volts that is dropped across each diode of a conventional diode bridge rectifier: smaller working voltages across the transmission lines 1 and 2 can therefore, be handled. Further details of the operation and characteristics of this MOSFET bridge rectifier can be found in U.K. 8332549.

The incoming transmission lines 1 and 2 are further respectively connected to a terminal 45, via an isolating capacitor, and to a terminal 44, via a further isolating capacitor connected in series with a bidirectional depletion mode switch 43. A ring detect circuit is itself connected to terminals 45 and 44. A voltage quadrupler 42 is connected as a floating driver across the gate and source of each MOSFET of the bidirectional switch 43. The voltage quadrupler is connected to the oscillator 11, so that when the oscillator 11 is operating the MOSFETS in the switch 43 are non-conducting, thus rendering the switch off and thus isolating the ring detect circuit from the transmission lines 1 and 2.

Conversely, when oscillator 11 is not operating, and no negative gate-source bias is applied to the MOSFETS of switch 43 by the voltage quadrupler 42, the residual channels in the MOSFETS allow transmission of the ringing signal to the ring detect circuit connected to terminals 44 and 45.

Terminal 5 receives a line voltage of positive polarity from the bridge rectifier 4. The further connections to terminal 5 and their operation are as hereinbefore described with reference to FIG. 1 and will not be further described with the exception of the features described below.

A terminal 50, connected to an internal power supply of the telephone instrument, is further connected, via a resistor 53 in series with a diode 54, to the terminal 32. Resistor 53 is connected to diode 54 via a terminal 55, which is further connected to a terminal 56. Terminal 56 is connected to both a terminal 60 and, via a diode 51 and an N channel enhancement type MOSFET 52 to a terminal 57 having a connection to earth via a resistor 58. Terminal 60 can be connected to an external control circuit such as a capacitor so that the input signal appearing on terminal 31 can be adjusted after the internal supply is powered up. Terminal 31 is connected to an input of a microprocessor of the telephone instrument for signalling the state of the hookswitch 34.

A further feature of the circuit illustrated in FIG. 2 is the floating driver controlling MOSFET 6, a voltage quadrupler being utilised as opposed to a voltage doubler.

It will be apparent that the hookswitch 34 need only be a pair of high resistance contacts, for instance conductive rubber pads, and that the need for a mechanical microswitch is completely eliminated.

It will be further apparent that a high degree of integration of the circuit is possible.

I claim:

1. A telephone instrument having electronic operating circuitry, and comprising a rectifier to provide, from the telephone line voltage, a d.c. supply voltage of predetermined polarity for the electronic operating circuitry, a hookswitch operable to apply the d.c. voltage from the rectifier to all of said electronic operating circuitry only when the instrument is off-hook, a first FET switching transistor connected in series with the output of the rectifier to supply the d.c. voltage from the rectifier to the operating circuitry, a second FET switching transistor responsive to the status of the hookswitch and being arranged to provide a current conduction path necessary to provide an enabling voltage to a control terminal of the first FET switching transistor, and said circuitry causing the status of the hookswitch to determine the status of the said second FET switching transistor.

2. A telephone instrument according to claim 1 having a control terminal for receiving a control signal to override the hookswitch in controlling said switching transistor.

3. A telephone instrument according to claim 2 including a line current interrupt switch operable to generate dialing pulses on the telephone lines, and dialing control pulse generating means to provide control pulses to said control terminal.

4. A telephone instrument according to claim 3 wherein the line current interrupt switch is controlled by the control pulses from said dialing control pulse generating means.

* * * * *